（12）United States Patent
Sahota et al.

(10) Patent No.: US 9,083,441 B2
(45) Date of Patent: Jul. 14, 2015

(54) IMPEDANCE BALANCING FOR TRANSMITTER TO RECEIVER REJECTION

(75) Inventors: Gurkanwal Singh Sahota, San Diego, CA (US); Frederic Bossu, San Diego, CA (US); Berke Cetinoneri, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 13/282,354

(22) Filed: Oct. 26, 2011

(65) Prior Publication Data

US 2013/0109330 A1   May 2, 2013

(51) Int. Cl.
H03C 1/52 (2006.01)
H04B 1/525 (2015.01)
H04B 1/58 (2006.01)

(52) U.S. Cl.
CPC ............... *H04B 1/525* (2013.01); *H04B 1/581* (2013.01)

(58) Field of Classification Search
CPC ............. H04B 1/18; H04B 1/40; H04B 1/48; H04B 1/0053; H04B 1/38; H04B 5/0012; H04B 5/0081; H04B 5/02; H01L 2924/3011; H01Q 1/243; H01Q 9/0442; H03F 1/56; H03F 2200/111; H03F 3/191; H03H 7/38; H03H 2007/386; H01F 38/14
USPC ............ 455/72–83, 107, 556.1, 120; 370/277
See application file for complete search history.

(56) References Cited

U.S. PATENT DOCUMENTS

| 3,699,444 | A |  | 10/1972 | Rabindra et al. |
| 4,747,160 | A |  | 5/1988 | Bossard |
| 5,179,302 | A |  | 1/1993 | Wagner |
| 6,211,671 | B1 |  | 4/2001 | Shattil |
| 7,142,811 | B2 | * | 11/2006 | Terranova et al. ........... 455/41.1 |
| 7,236,802 | B2 | * | 6/2007 | Cairo ......................... 455/556.1 |

(Continued)

FOREIGN PATENT DOCUMENTS

| CN | 102006102 A | 4/2011 |
| EP | 2296286 A2 | 3/2011 |

(Continued)

OTHER PUBLICATIONS

Mikhemar, et al., "A Tunable Integrated Duplexer with 50dB Isolation in 40nm CMOS," ISSCC 2009, paper 22.7, 2009, pp. 386-387.

(Continued)

*Primary Examiner* — Fayyaz Alam
*Assistant Examiner* — Max Mathew

(57) ABSTRACT

Exemplary embodiments are directed to impedance balancing within a transceiver. A device may include a transformer having a first side coupled to a transmit path and a second side coupled to a receive path. Further, the device may include an antenna tuning network coupled to a first portion of the first side and configured for coupling to an antenna. The device may also include an adjustment unit coupled to a second portion of the first side and configured for being adjusted to enable an impedance at the adjustment unit to be substantially equal to an impedance at the antenna tuning network.

13 Claims, 15 Drawing Sheets

(56) References Cited

U.S. PATENT DOCUMENTS

| | | | |
|---|---|---|---|
| 7,372,327 | B2 | 5/2008 | Westwick et al. |
| 7,848,713 | B2 | 12/2010 | Cabanillas et al. |
| 8,005,448 | B1 | 8/2011 | Yan et al. |
| 8,090,044 | B2 | 1/2012 | Rofougaran |
| 8,208,865 | B2 * | 6/2012 | Mikhemar et al. ............ 455/73 |
| 8,521,117 | B1 | 8/2013 | Gupta et al. |
| 2003/0022638 | A1 * | 1/2003 | Imai et al. ................ 455/107 |
| 2003/0235160 | A1 | 12/2003 | Saifuddin |
| 2007/0105509 | A1 | 5/2007 | Muhammad et al. |
| 2008/0009257 | A1 | 1/2008 | Safarian et al. |
| 2008/0242245 | A1 | 10/2008 | Aparin |
| 2008/0303609 | A1 | 12/2008 | Abe et al. |
| 2009/0117855 | A1 | 5/2009 | Rofougaran |
| 2009/0156152 | A1 | 6/2009 | Sahota et al. |
| 2009/0186582 | A1 | 7/2009 | Muhammad et al. |
| 2009/0213770 | A1 | 8/2009 | Mu |
| 2009/0253385 | A1 | 10/2009 | Dent et al. |
| 2010/0029323 | A1 | 2/2010 | Tasic et al. |
| 2010/0271987 | A1 | 10/2010 | Chiu et al. |
| 2010/0295629 | A1 | 11/2010 | Klemens et al. |
| 2011/0053525 | A1 | 3/2011 | Yi |
| 2011/0064005 | A1 | 3/2011 | Mikhemar et al. |
| 2011/0068636 | A1 | 3/2011 | Lee et al. |
| 2011/0128088 | A1 | 6/2011 | Jin et al. |
| 2011/0158135 | A1 * | 6/2011 | Mikhemar et al. ............ 370/277 |
| 2012/0098549 | A1 | 4/2012 | Wang et al. |
| 2012/0188024 | A1 | 7/2012 | Yamanouchi |
| 2012/0295553 | A1 | 11/2012 | Sahota |
| 2013/0258911 | A1 | 10/2013 | Choksi |
| 2013/0259099 | A1 | 10/2013 | Gudem et al. |
| 2013/0259102 | A1 | 10/2013 | Gudem et al. |
| 2013/0343237 | A1 | 12/2013 | Mikhemar et al. |
| 2014/0085951 | A1 | 3/2014 | Kaeriyama et al. |

FOREIGN PATENT DOCUMENTS

| | | |
|---|---|---|
| EP | 2393211 A2 | 12/2011 |
| GB | 1123416 A | 8/1968 |
| WO | WO-2005050896 A2 | 6/2005 |
| WO | 2005104564 A1 | 11/2005 |
| WO | WO-2011104313 A1 | 9/2011 |

OTHER PUBLICATIONS

Mikhemar, et al., "An On-Chip Wideband and Low-Loss Duplexer for 3G/4G CMOS Radios," IEEE Symposium on VLSI Circuits 2010, pp. 129-130.

Pursula, et al., "Hybrid Transformer-Based Adaptive RF Front End for UHF RFID Mobile Phone Readers," IEEE International Conference on RFID, 2008, pp. 150-155.

Sartori, "Hybrid Transformers," IEEE Trans. of Parts, Materials and Packaging, vol. 4, No. 3, 1968, pp. 59-66.

Sorsby et al. Practical High-Efficiency Partial-Envelope Tracking Power Amplifier System with Broadband Applications. IEEE Radio and Wireless Symposium (RWS) [Online] , pp. 104-107.(2010).

Wu et al. "A High IIP2 Gilbert Mixer-Based Downconverter Design for Direct-Conversion WiMAX Receivers". IEEE Radio and Wireless Symposium (RWS) [Online] pp. 404-407 (2010).

Darabi, et al., "Highly Integrated and Tunable RF Front Ends for Reconfigurable Multiband Transceivers: A Tutorial," IEEE Transactions on Circuits and Systems, Regular Papers, vol. 58, No. 9, Sep. 2011, pp. 2038-2050.

International Search Report and Written Opinion—PCT/US2012/062276—ISA/EPO—Jun. 19, 2013.

Partial International Search Report—PCT/US2012/062276—ISA/EPO—Mar. 18, 2013.

Bjontegaard G., et al., "Adaptive deblocking filter", IEEE Transactions on Circuits and Systems for Video Technology, IEEE Service Center, Piscataway, NJ, US, vol. 13, No. 7, Jul. 1, 2003, pp. 614-619, XP011099254, ISSN: 1051-8215.

European Search Report—EP14181051—Search Authority—Munich—Nov. 25, 2014.

European Search Report—EP14181305—Search Authority—Munich—Nov. 28, 2014.

"Information technology—Generic coding of moving pictures and associated audio information: Video; H.262 (Feb. 2000)" ITU-T Standard in Force (I), International Telecommunication Union, Geneva, CH, No. H.262, Feb. 1, 2000, XP017401436.

Vatis Y et al.: "Coding of coefficients of two-dimensional non-separable adaptive Wiener interpolation filter" Proceeding of the SPIE—The International Society for Optical Engineering, SPIE, PO Box 10 Bellingham WA 98227-0010 USA, vol. 5960, Jul. 12, 2005, pp. 623-631, XP002419200.

* cited by examiner

IMPEDANCE BALANCING FOR TRANSMITTER TO RECEIVER REJECTION

BACKGROUND

1. Field

The present invention relates generally to transceivers. More specifically, the present invention relates to transmitter to receiver rejection based on impedance balancing within a transceiver, feed forward cancellation within a transceiver, or both.

2. Background

As will be appreciated by a person having ordinary skill in the art, a wireless device may be able to simultaneously transmit and receive data on two frequency channels. A duplexer may be configured to route an RF input signal from an antenna to a receiver and to route a transmit signal from a transmitter to the antenna. Duplexers, which may provide isolation between a transmitter and a receiver sharing a single antenna, may perform both transmit filtering and receive filtering. More specifically, a duplexer may provide stop-band attenuation (e.g., approximately 50 dB) in a receive band (i.e., to strongly attenuate signals from extraneous sources in the receive frequency band) and stop-band attenuation (e.g., approximately 50 dB) in a transmit band, so that transmit signals do not leak into and saturate a receive chain. In the absence of such a duplexer, a conventional transceiver may not provide adequate performance.

Typically, a duplexer is commonly the largest and most costly component in a transceiver. Existing multi band/mode cellular devices use discrete duplexers, power amplifiers, and dedicated low-noise amplifier inputs for each radio frequency band, and sometimes more. With the number of bands increasing, this has proven to be costly. An integrated solution, which can use a single duplexer, power amplifier, and a low-noise amplifier (LNA) is desirable to reduce size and cost. A need exists for methods, systems, and devices for balancing impedances within a transceiver, feedforward cancellation within a receiver, or both, to provide adequate transmitter to receiver rejection.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Exemplary embodiments, as described herein, relate to a transceiver including at least one transformer and configured for providing impedance balancing and/or feedforward cancellation to enable for adequate transmitter to receiver rejection. More specifically, exemplary embodiments may include a transceiver having at least one transformer coupled to each of a receive path and a transmit path of the transceiver. Further, the transceiver may include an antenna tuning network coupled between an antenna and a first port of the transformer and a balancing network coupled to another port of the transformer. Substantially balancing an impedance of the balancing network to substantially match an impedance of the antenna tuning network may provide adequate transmitter to receiver rejection.

Figure 1:
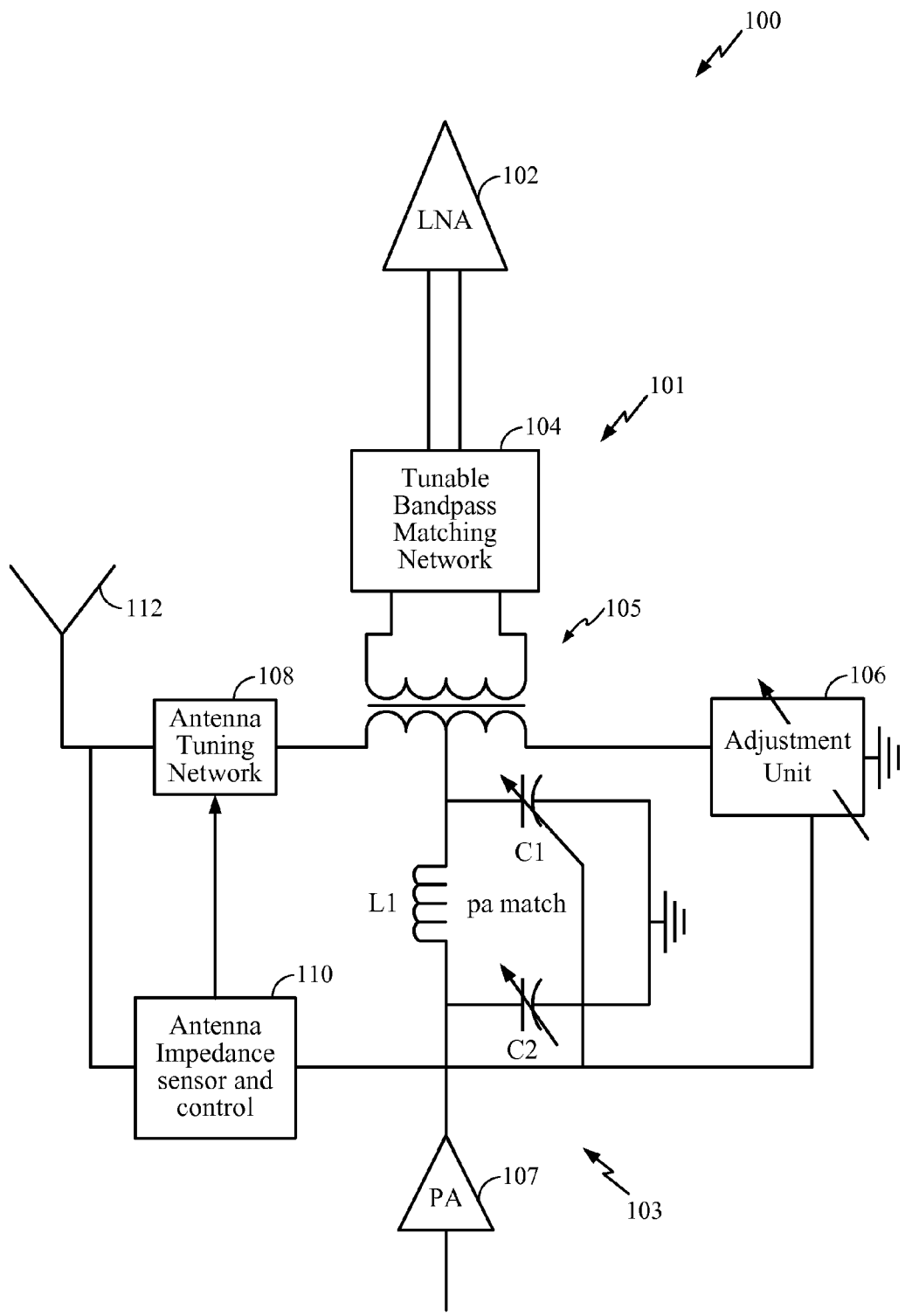
FIG. 1 illustrates a transceiver including a transformer, according to an exemplary embodiment of the present invention.

FIG. 1 illustrates a portion of a transceiver 100, according to an exemplary embodiment of the present invention. Transceiver 100 includes a transmit path 103 including a power amplifier 107, which is coupled to a first side (e.g., a center port of a primary side) of transformer 105. Transceiver 100 further includes a receive path 101 including a low noise amplifier (LNA) 102 and a tunable bandpass matching network 104. Receive path 101, and more specifically, tunable bandpass matching network 104 is coupled to a second side (e.g., a secondary side) of a transformer 105.

Furthermore, transceiver 100 includes an adjustment unit 106, an antenna tuning network 108, an antenna impedance sensor and control unit 110, and an antenna 112. According to one exemplary embodiment, adjustment unit 106 may comprise an impedance balance network. According to another exemplary embodiment, adjustment unit 106 may comprise a feedforward cancellation unit. As illustrated in FIG. 1, antenna tuning network 108 is coupled between antenna 112 and the first side of transformer 105. More specifically, for example, antenna tuning network 108 is coupled between antenna 112 and an antenna port of the primary side of transformer 105. Further, antenna impedance sensor and control unit 110 is coupled to each of antenna 112, antenna tuning network 108, and adjustment unit 106. Antenna impedance sensor and control unit 110 may be configured to sense an impedance of antenna 112 and tune network 108. Moreover, adjustment unit 106 is coupled to the first side of transformer 105. More specifically, for example only, adjustment unit 106 is coupled to a balance port of the primary side of transformer 105. It is noted that impedance sensor and control unit 110 may sense and control the impedance of adjustment unit 106.

Transceiver 100 further includes power amplifier matching circuitry, which includes a capacitor C1, a capacitor C2, and an inductor L1. As described more fully below, transceiver 100 may include a feedback path from an output of LNA 102 to adjustment unit 106. The feedback path may be configured to sense a strength of a transmit signal (i.e., the transmit leakage) at a receiver input (i.e., at an input of LNA 102) and, thus, enable a transmit signal at the receiver input to be cancelled. It is noted that transformer 105, adjustment unit 106, antenna tuning network 108, and antenna impedance sensor and control unit 110 together may be referred to as a "tunable unit."

In accordance with an exemplary embodiment of the present invention, transceiver 100 and, more specifically, transformer 105, adjustment unit 106, antenna tuning network 108, and antenna impedance sensor and control unit 110 may emulate a duplexer and, thus, provide adequate rejection from transmit path 103 to receive path 105. More specifically, in this embodiment, adjustment unit 106 may comprise an impedance balance network. Further, antenna tuning network 108, adjustment unit 106, or both, may be dynamically adjusted to enable an impedance at adjustment unit 106 to be substantially equal to an impedance at antenna 112. As will be appreciated by a person having ordinary skill in the art, if an impedance at adjustment unit 106 is substantially equal to an impedance at antenna 112, adequate rejection from transmit path 103 to receive path 105 may be provided. Accordingly, transceiver 100 may be configured to provide impedance balancing, as described above, transmit leakage cancellation, as described more fully below, or both. It is noted that during a contemplated operation of transceiver 100, half of the power received by antenna 112 (i.e., from an external source) may be conveyed to receive path 105 and half of the power received may be conveyed to adjustment unit 106. Similarly, half of the power conveyed from transmit path 103 may be received at antenna 112 and half of the power conveyed from transmit path 103 may be received at adjustment unit 106. It is noted that it is not required to balance transformer 105 in any of the exemplary embodiments described herein. For example, a transformer may be unbalanced to get more power out of one or more associated antennas, as will be appreciated by a person having ordinary skill in the art.

Figure 2:
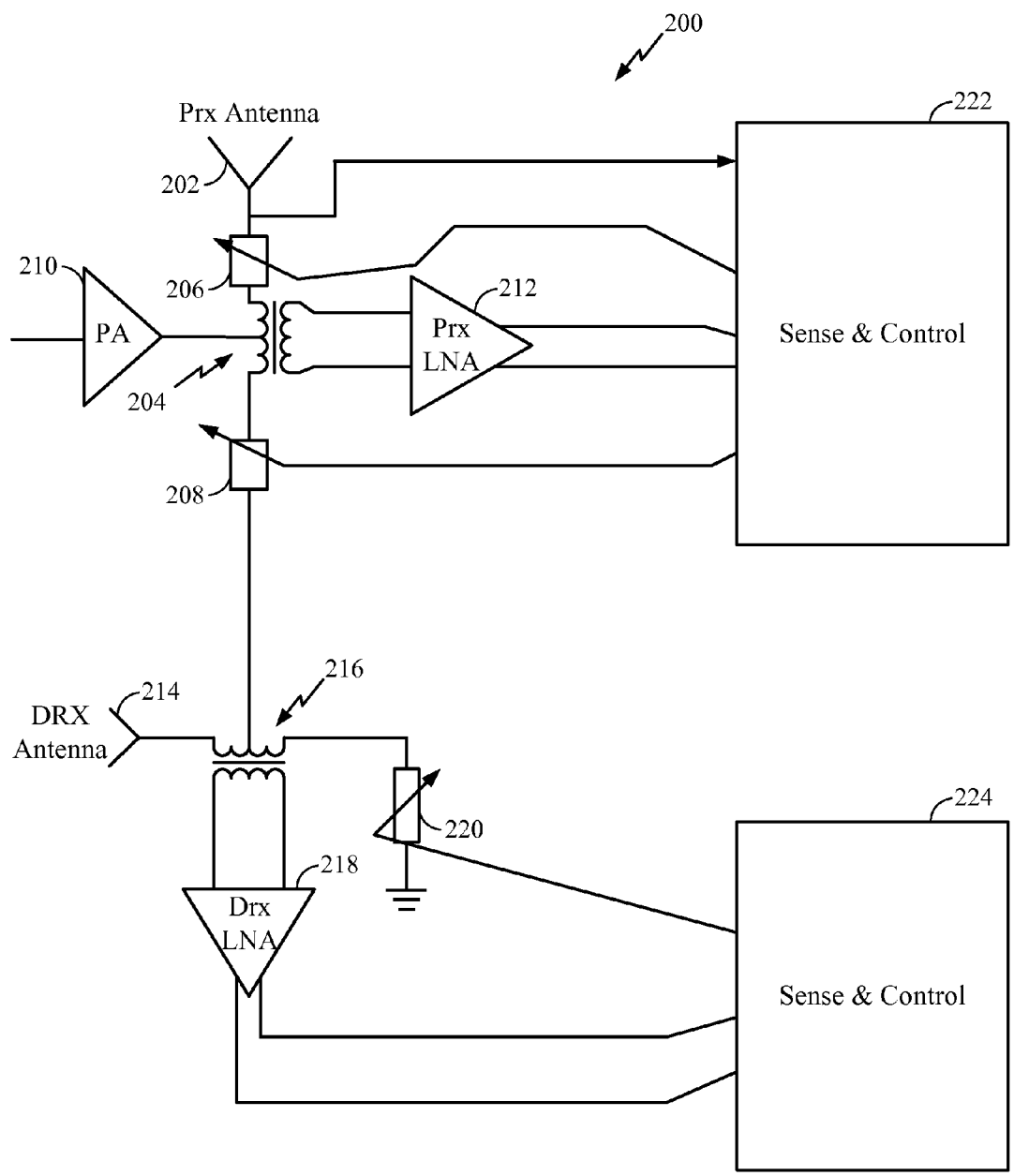
FIG. 2 illustrates another transceiver including a primary transformer and a diversity transformer, in accordance with an exemplary embodiment of the present invention.

FIG. 2 depicts a transceiver 200, according to another exemplary embodiment of the present invention. Transceiver 200 includes a primary antenna 202 and a first transformer 204. Transceiver 200 further includes a first network 206 coupled to a first port of first transformer 204, and a second network 208 coupled to a second port of first transformer, wherein each of first network 206 and second network 208 are coupled to a first side of first transformer 204. More specifically, for example only, first network 206 is coupled to an antenna port of a primary side of first transformer 204 and second network 208 is coupled to a balance port of the primary side of first transformer 204. For example only, first network 206 may comprise an antenna tuning network, such as antenna tuning network 108 illustrated in FIG. 1. Further, second network 208 may comprise an impedance balance network. In addition, an output of a power amplifier 210 (i.e., the transmit path) is coupled to the first side of first transformer 204 (e.g., coupled to a center port) and an input of primary low-noise amplifier (LNA) 212 (i.e., the receive path) is coupled to a second side of first transformer 204.

Moreover, transceiver 200 includes a diversity antenna 214 and a third network 220, each coupled to a first side of a second transformer 216. Further, second network 208 is coupled to the first side of second transformer 216 (e.g., at a center port) and an input of diversity low-noise amplifier (LNA) 218 (i.e., the receive path) is coupled to a second side of second transformer 216. By way of example only, third network 220 may comprise another impedance balance port. Transceiver 200 also includes a first controller 222 and a second controller 224. By way of example only, first controller 222 and second controller 224 may be configured to sense and adjust impedance levels, as well as sense a transmit signal level on a receive path (e.g., output from LNA 212 or LNA 218). More specifically, first controller 222 may be configured to sense an impedance at primary antenna 202, dynamically adjust each of first network 206 and second network 208 (e.g., tune antenna 202, adjust an impedance at second network 208, or both), and sense a level of a transmit signal output from LNA 212. Second controller 224 may be configured to sense a level of a transmit signal output from LNA 218 and dynamically adjust third network 220 to enable a transmit signal at an input of LNA 218 to be cancelled. It is noted that transformers 204 and 216, first network 206, second network 208, third network 220, as well as first controller 222 and second controller 224, may be referred to as a "tunable unit."

During a contemplated operation of transceiver 200, a transmit signal output from power amplifier 210 may be split among first network 206 and second network 208. More specifically, substantially half of the power received from power amplifier 210 may be conveyed to and transmitted by antenna 202 via balance port 206 and substantially half of the power may be conveyed to second network 208. Similarly to transceiver 100, second network 208 may be dynamically adjusted to enable an impedance at second network 208 to be substantially equal to an impedance at antenna 202. Therefore, transceiver 200 may provide adequate rejection from a transmit path associated with primary antenna 202 to a receive path associated with primary antenna 202.

Further, the power conveyed to second network 208 may be further conveyed to second transformer 216. Upon arrival at second transformer 216, half of the power of the transmit signal (i.e., one-fourth of the power conveyed from power amplifier 210) may be conveyed to and transmitted by diversity antenna 214, and the other half of the power (i.e., one-fourth of the power conveyed from power amplifier 210) may be conveyed to third network 220. Further, third network 220 may be dynamically adjusted to cancel any portion of the transmit signal conveyed through diversity LNA 218 (i.e., transmit leakage).

Figure 3:
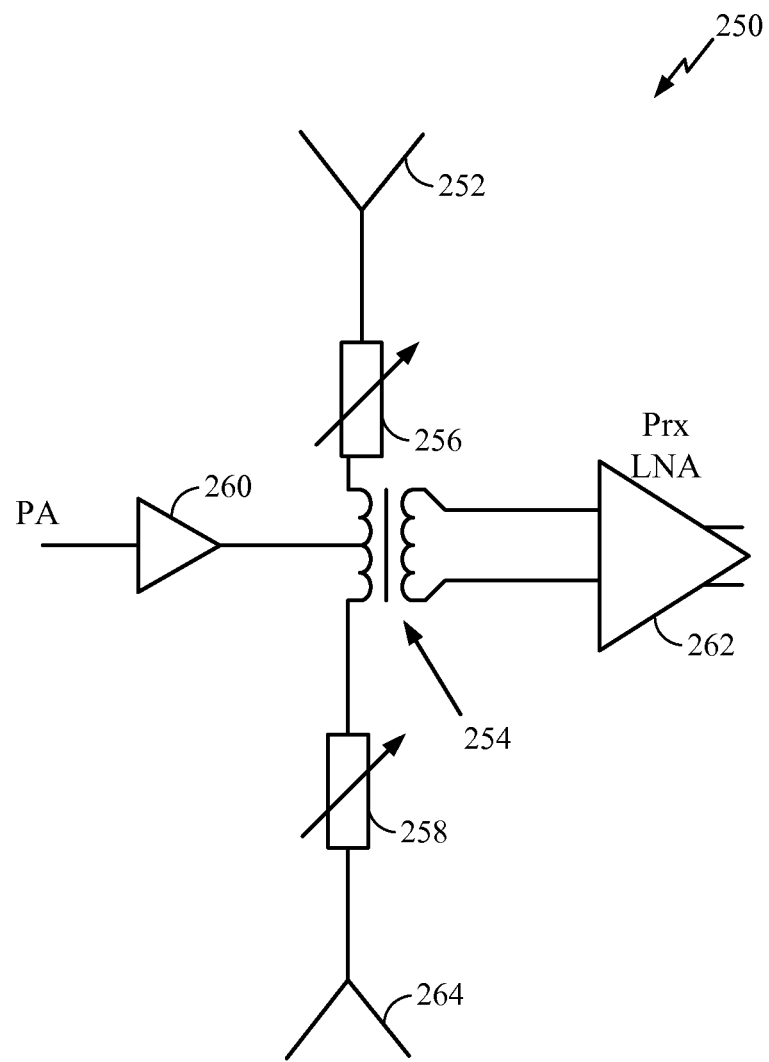
FIG. 3 illustrates another transceiver, according to an exemplary embodiment of the present invention.

With reference to FIG. 3, a transceiver 250, in accordance with an exemplary embodiment of the present invention, is depicted. Transceiver 250 includes a first antenna 252 and a transformer 254. Transceiver 250 further includes a first network 256 and a second network 258, wherein each of first network 256 and second network 258 are coupled to a first side of transformer 254. More specifically, first network 256 may be coupled to an antenna port of a primary side of transformer 254 and second network 258 may be coupled to a balance port of the primary side of transformer 254. In addition, an output of a power amplifier 260 may be coupled to a center port of the primary side of transformer 254. Further, an input of a primary low-noise amplifier (LNA) 262 is coupled to secondary-side of transformer 254. Transceiver further includes a second antenna 264 coupled to the first side of transformer 254 via second network 258. It is noted that a plurality of antennas may be utilized to enable for recovery of more transmit output power. Accordingly, the use of dual antennas, as illustrated in FIG. 3, is not limited to receiver diversity.

Figure 4:
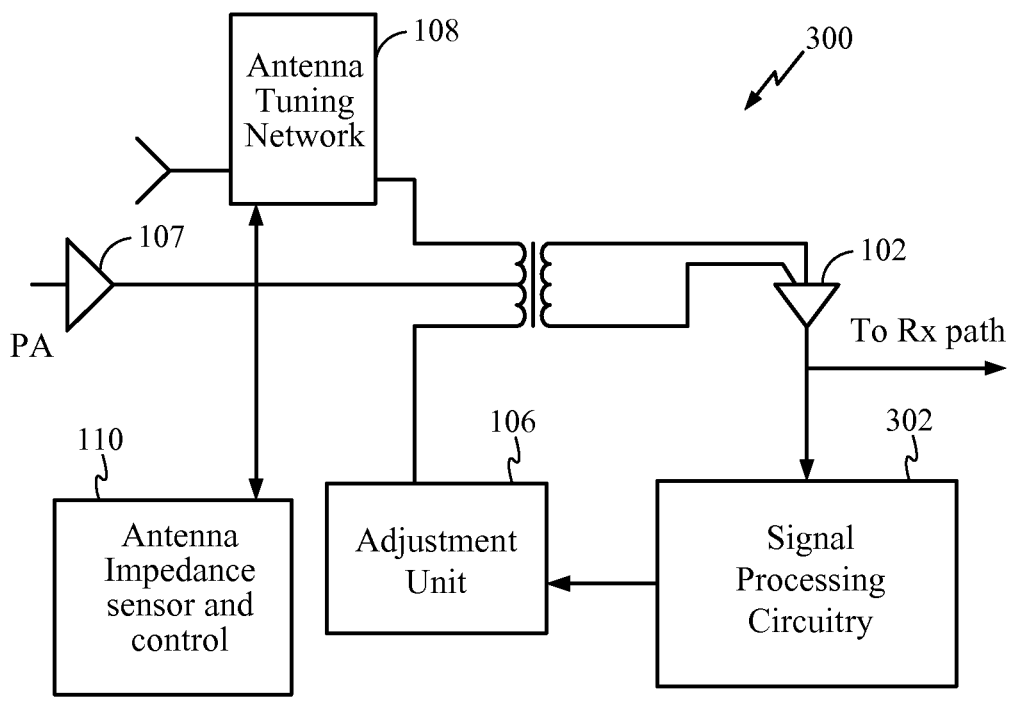
FIG. 4 illustrates a transceiver including transmit signal sense circuitry, according to an exemplary embodiment of the present invention.

FIG. 4 block diagram of a transceiver 300, according to an exemplary embodiment of the present invention. Similarly to the transceivers discussed above, transceiver 300 includes a transformer having a first side, which is coupled to an antenna, a balance port, and a transmit path. Further, transceiver 300 includes a second side coupled to a receive path. Moreover, according to an exemplary embodiment, transceiver 300 includes signal processing circuitry 302 configured to sense a transmit signal (i.e., transmit leakage) on the receive path (e.g., sense an amount of transmit signal output from LNA 102) and convey a signal to adjustment unit 106 for appropriate adjustment thereof to minimize the transmit leakage on the receive path and enable the impedance at the adjustment unit 106 to substantially match the impedance at antenna tuning network 108.

Figure 5:
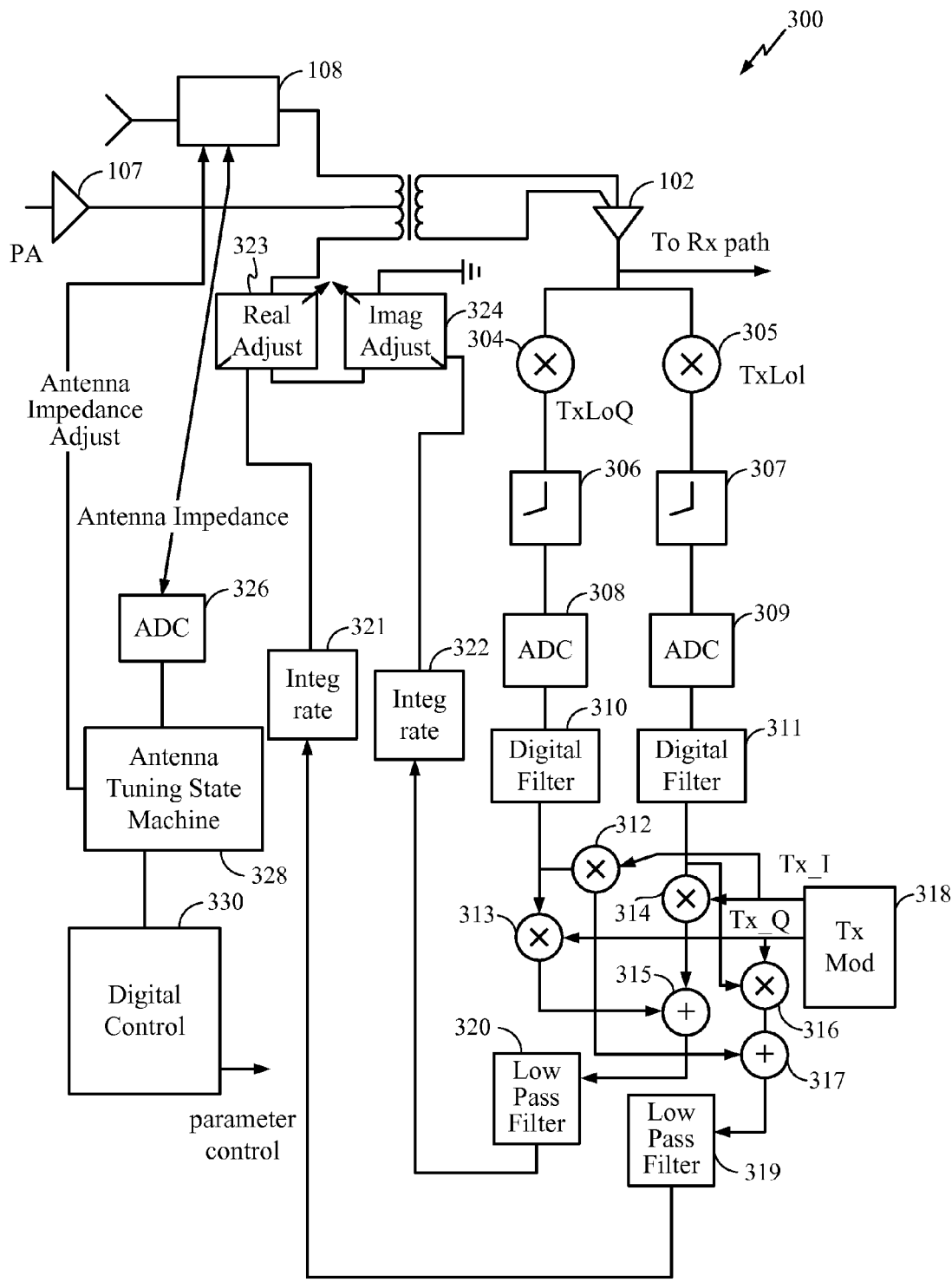
FIG. 5 is a block diagram illustrating a transceiver including transmit signal sense circuitry, in accordance with an exemplary embodiment of the present invention.

FIG. 5 is a more detailed block diagram of a transceiver 300, according to an exemplary embodiment of the present invention. As an example, signal processing circuitry 302 (see FIG. 4) may include mixers 304 and 305 for down-converting I and Q transmit signals. Further, circuitry 302 may include filters 306 and 307, analog-to-digital converters 308 and 309, digital filters 310 and 311. Moreover, mixers/adders 312-317 and modulator 318 may be configured to sense an imbalance between adjustment unit 106 (see FIG. 1) and antenna 112. Circuitry 302 may also include low-pass filters 319 and 320, integration units 321 and 322, real adjust unit 323, and imaginary adjust unit 324. It is noted that adjustment unit 106 (see FIG. 4) may comprise real adjust unit 323 and imaginary adjust unit 324. Moreover, by way of example, antenna impedance sensor and control unit 110 (see FIG. 4) may comprise an analog-to-digital converter 326, state machine 328, and digital control 330.

Figure 6A:
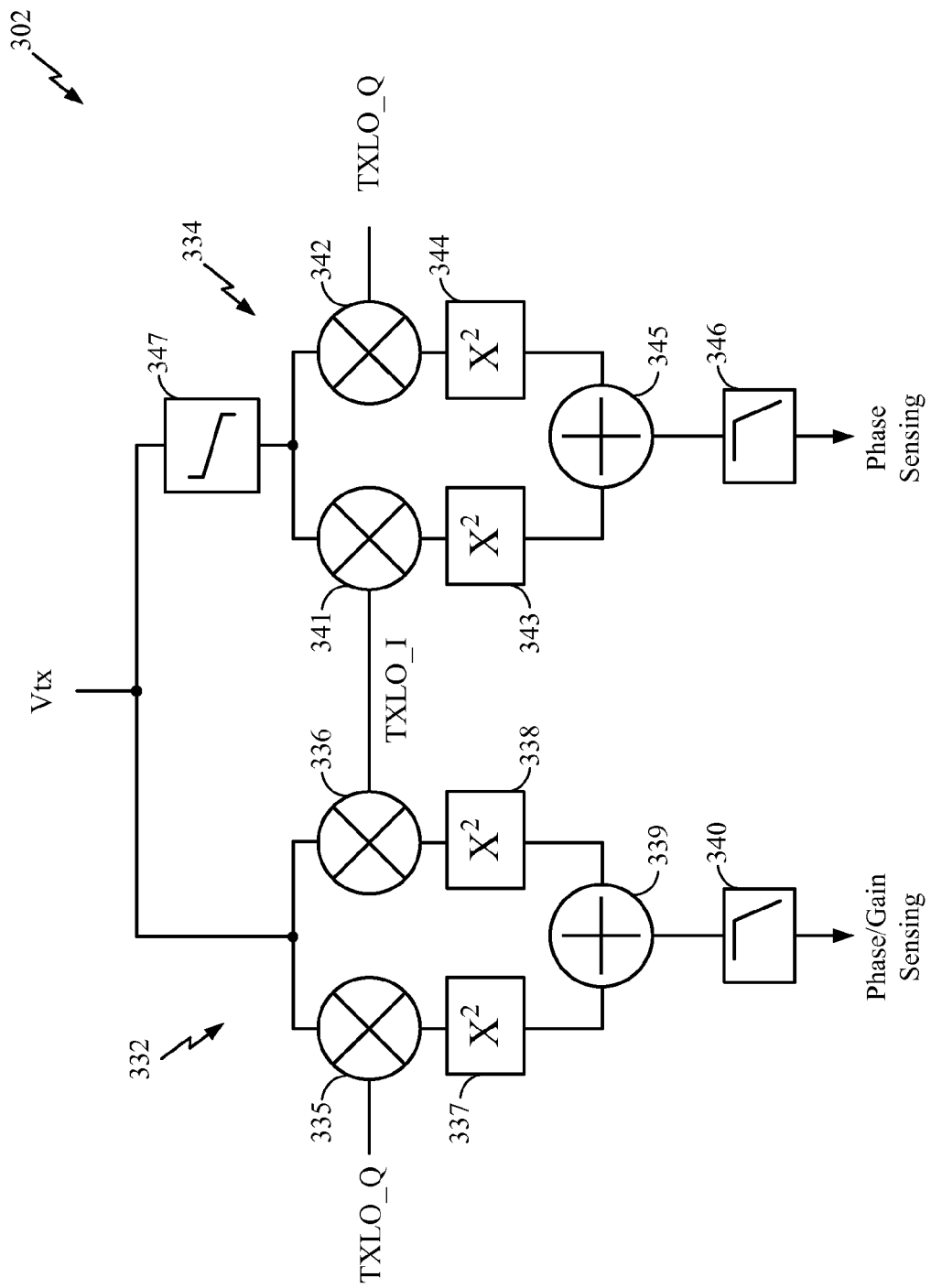
FIGS. 6A and 6B are block diagrams illustrating transmit signal sense circuitry, in accordance with exemplary embodiments of the present invention.

FIG. 6A illustrates another example of circuitry 302 (see FIG. 4). In this example, circuitry 302 may be configured to determine a phase and amplitude difference between adjustment unit 106 and antenna tuning network 108. As illustrated in FIG. 6A, circuitry 302 may include a first path 332 configured to determine a amplitude and phase difference between adjustment unit 106 and antenna tuning network 108 and a second path 334 configured to determine a phase difference between adjustment unit 106 and antenna tuning network 108. First path 332 may comprise quadrature I/Q down-converters 335 and 336 working at transmitter signal frequency, squaring units 337 and 338, summer 339, and filter 340. Second path 334 may include limiter 347, quadrature I/Q down-converters 341 and 342, squaring units 343 and 344, summer 345, and filter 346. It is noted that first path 332, which configured to determine a amplitude and phase difference between adjustment unit 106 and antenna tuning network 108, may be used to control a real part of adjustment unit 106 and second path 334, which configured to determine a phase difference between adjustment unit 106 and antenna tuning network 108, may be used to control an imaginary part of adjustment unit 106.

Figure 6B:
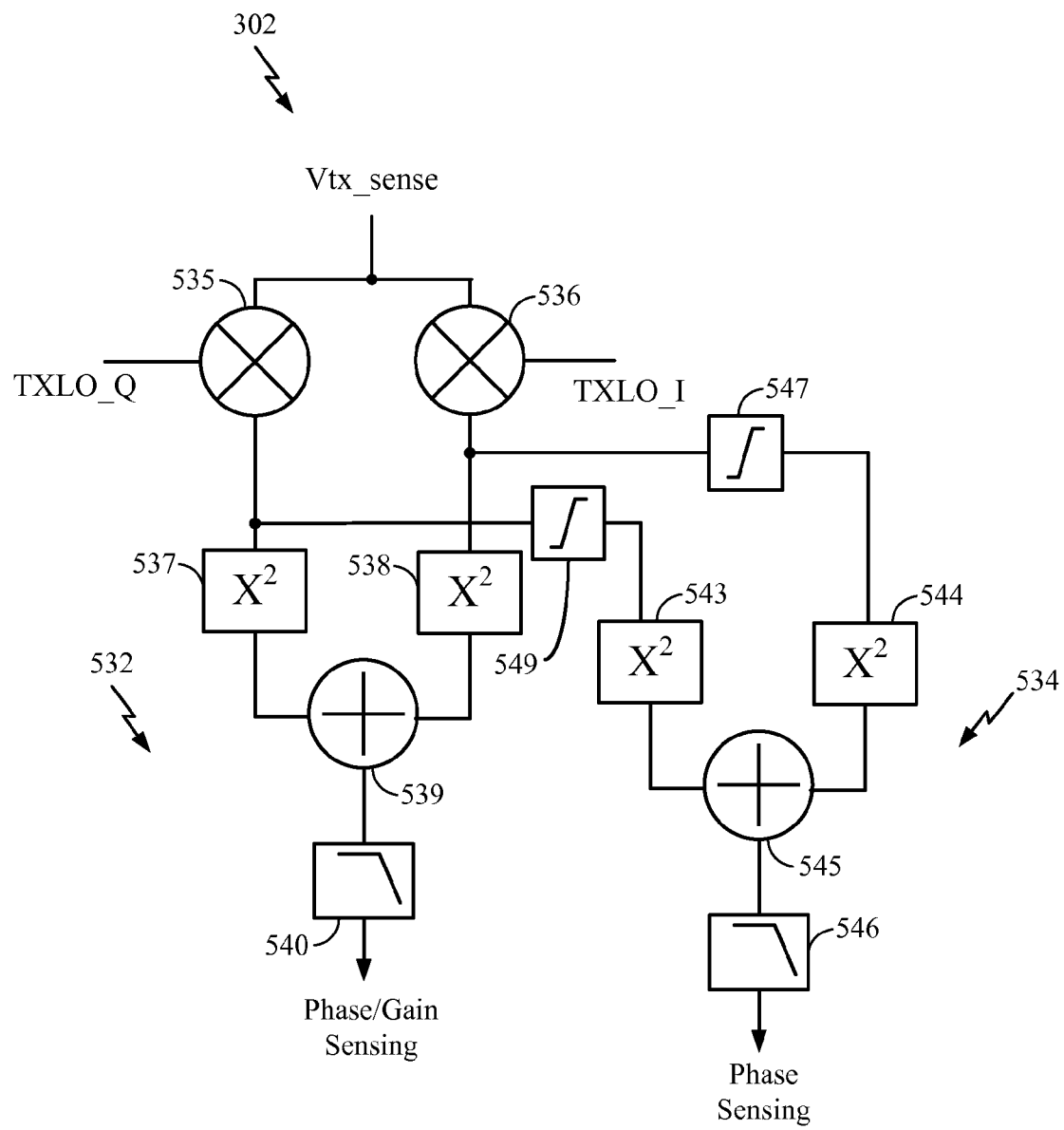

FIG. 6B illustrates another example of circuitry 302 (see FIG. 4). In this example, circuitry 302 may be configured to determine a phase and amplitude difference between adjustment unit 106 and antenna tuning network 108 (see e.g., FIG. 1). As illustrated in FIG. 6B, circuitry 302 may include a first path 532 configured to determine a amplitude and phase difference between adjustment unit 106 and antenna tuning network 108 and a second path 534 configured to determine a phase difference between adjustment unit 106 and antenna tuning network 108. Circuitry 302 may comprise quadrature I/Q down-converters 535 and 536 working at transmitter signal frequency. Further, first path 532 includes squaring units 537 and 538, summer 539, and filter 540. Second path 334 may include limiters 549 and 547, squaring units 543 and 544, summer 545, and filter 546. It is noted that first path 532, which configured to determine a amplitude and phase difference between adjustment unit 106 and antenna tuning network 108, may be used to control a real part of adjustment unit 106 and second path 534, which configured to determine a phase difference between adjustment unit 106 and antenna tuning network 108, may be used to control an imaginary part of adjustment unit 106.

Figure 7:
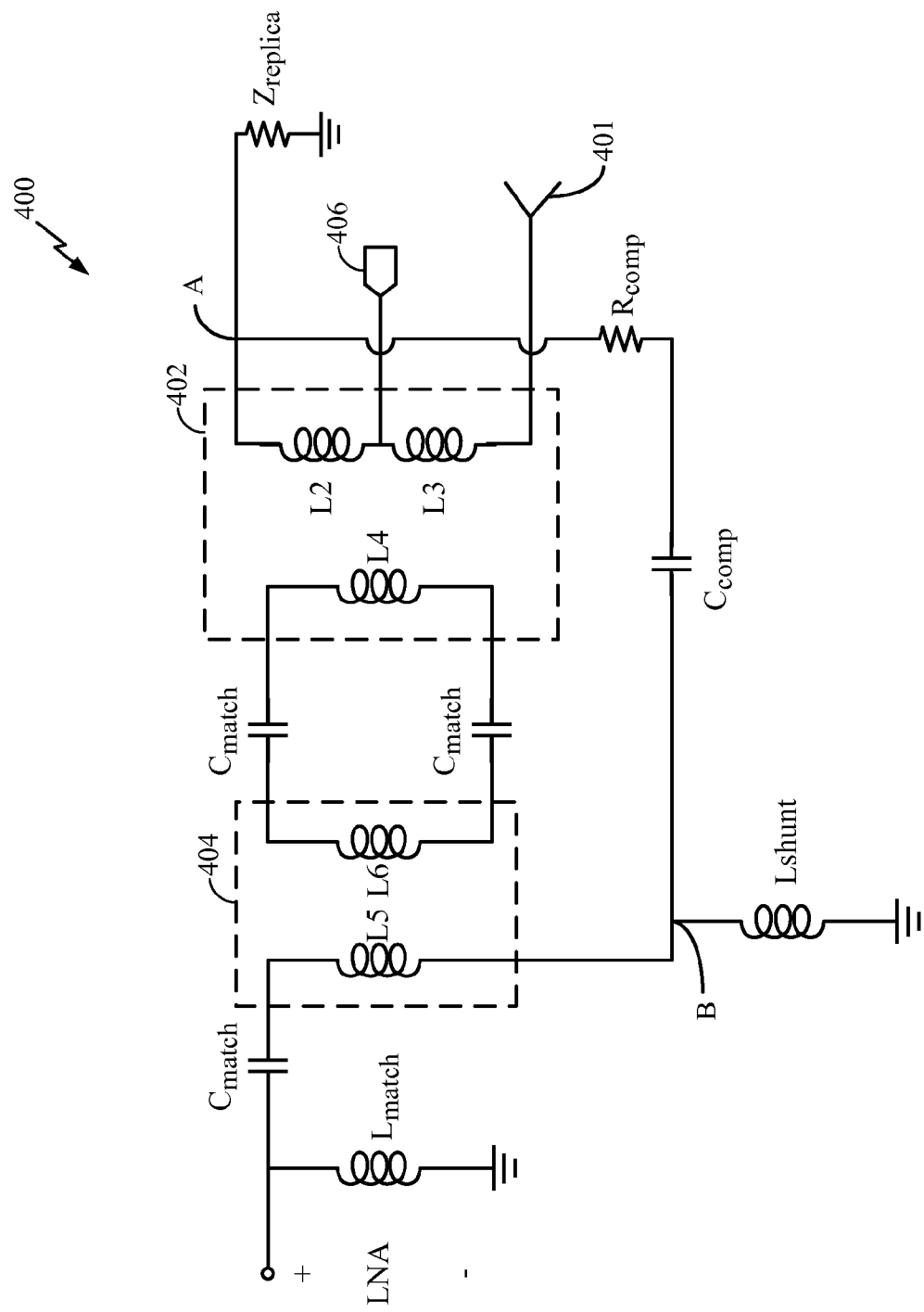
FIG. 7 depicts a transceiver including a plurality of transformers, according to an exemplary embodiment of the present invention.

FIG. 7 is a circuit diagram of a transceiver 400, according to an exemplary embodiment of the present invention. As will be described more fully below, transceiver 400 includes a dual transformer with feed forward cancellation. Transceiver 400 includes an antenna 401 coupled to a first transformer 402 having inductors L2, L3, and L4. More specifically, a primary side of first transformer 402 includes inductors L2 and L3 and a secondary side of first transformer includes inductor L4. By way of example only, first transformer 402 may comprise the first (i.e., primary) side of transformer 105 illustrated in FIG. 1. Further, transceiver 400 includes a second transformer 404 including inductors L5 and L6, wherein inductor L4 of first transformer 402 is coupled to inductor L6 of second transformer 404 via matching capacitors $C_{match}$. It is noted that a primary side of second transformer 404 includes inductor L6 and a secondary side of second transformer includes inductor L5. By way of example only, second transformer 402 may comprise the second (i.e., secondary) side of transformer 105 illustrated in FIG. 1.

Transceiver 400 may also include a replica port including a resistor $Z_{replica}$, which is coupled to inductor L2. Moreover, a power amplifier 406 is coupled to a center port of transformer 402, between inductors L2 and L3. Transceiver 400 may also include a capacitor $C_{comp}$ and a resistor $R_{comp}$ coupled between a node A and inductor L5. For example, adjustment unit 106, as illustrated in FIG. 1, may comprise a feedforward cancellation unit including a capacitor $C_{comp}$ and a resistor $R_{comp}$. In addition, transceiver 400 includes a capacitor $C_{match}$ and an inductor $L_{match}$ coupled to an input of an LNA, which may comprise LNA 102 of FIG. 1. By way of example, tunable bandpass matching network 104 (see FIG. 1) may comprise capacitor $C_{match}$ and an inductor $L_{match}$.

Transceiver 400 may further include an inductor $L_{shunt}$ coupled to a node B between inductor L5 and capacitor $C_{comp}$. Inductor $L_{shunt}$ may present a low impedance path at RF and may enable for compensation. It is noted that values of resistor $R_{comp}$ and capacitor $C_{comp}$ may be adjusted based on a strength of a transmitter signal measured at a receiver port (i.e., transmit leakage). It is further noted that secondary transformer 404 may inject a fraction of a transmit signal back to the LNA to at least partially cancel the transmit signal at the input of the LNA, wherein a phase and amplitude of the transmit signal is controlled by the values of capacitor $C_{comp}$ and a resistor $R_{comp}$ to obtain maximum transmit signal cancellation. The values of capacitor $C_{comp}$ and resistor $R_{comp}$ may be controlled by circuitry, such as signal processing circuitry 302 illustrated in FIGS. 5 or 6.

Figure 8:
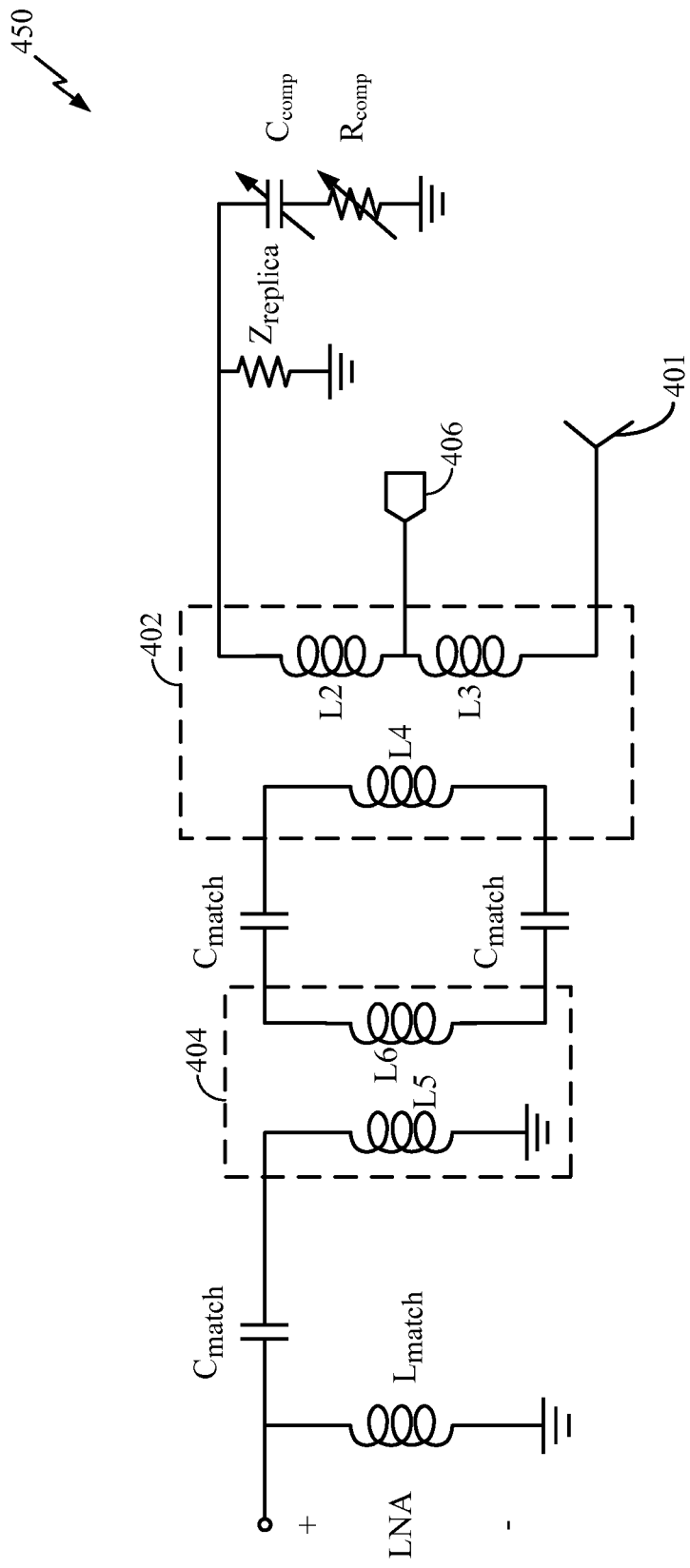
FIG. 8 depicts another transceiver including a plurality of transformers, according to an exemplary embodiment of the present invention.

FIG. 8 is a circuit diagram of a transceiver 450, according to an exemplary embodiment of the present invention. As will be described more fully below, transceiver 450 includes a dual transformer without feed forward cancellation. Transceiver 450 includes antenna 401 coupled to first transformer 402 having inductors L2, L3, and L4. Further, transceiver 400 includes second transformer 404 including inductors L5 and L6, wherein inductor L4 or first transformer 402 is coupled to inductor L6 of second transformer 404 via matching capacitors $C_{match}$. Moreover, power amplifier 406 is coupled between inductors L2 and L3.

Transceiver 450 may also include a replica port including a resistor $Z_{replica}$, which is coupled to inductor L2. Transceiver 400 may also include capacitor $C_{comp}$ and resistor $R_{comp}$ coupled in parallel with resistor $Z_{replica}$. For example, adjustment unit 106, as illustrated in FIG. 1, may comprise a feedforward cancellation unit including capacitor $C_{comp}$ and a resistor $R_{comp}$. It is noted that values of resistor $R_{comp}$ and capacitor $C_{comp}$ may be adjusted based on a strength of a transmitter signal measured at a receiver port (i.e, transmit leakage). The values of capacitor $C_{comp}$ and resistor $R_{comp}$ may be controlled by circuitry, such as signal processing circuitry 302 illustrated in FIG. 5 or 6. Due to being in parallel with resistor Zreplica, capacitor $C_{comp}$ and resistor $R_{comp}$ may be adequately controlled to easily tolerate process variations and errors. In addition, transceiver 400 includes a capacitor $C_{match}$ and an inductor $L_{match}$. By way of example, tunable bandpass matching network 104 (see FIG. 1) may comprise capacitor $C_{match}$ and an inductor $L_{match}$. It is noted that transformers 402 and 404, capacitor $C_{comp}$ and resistor $R_{comp}$, as illustrated in FIGS. 7 and 8, may be referred to as a "tunable unit."

Figure 9:
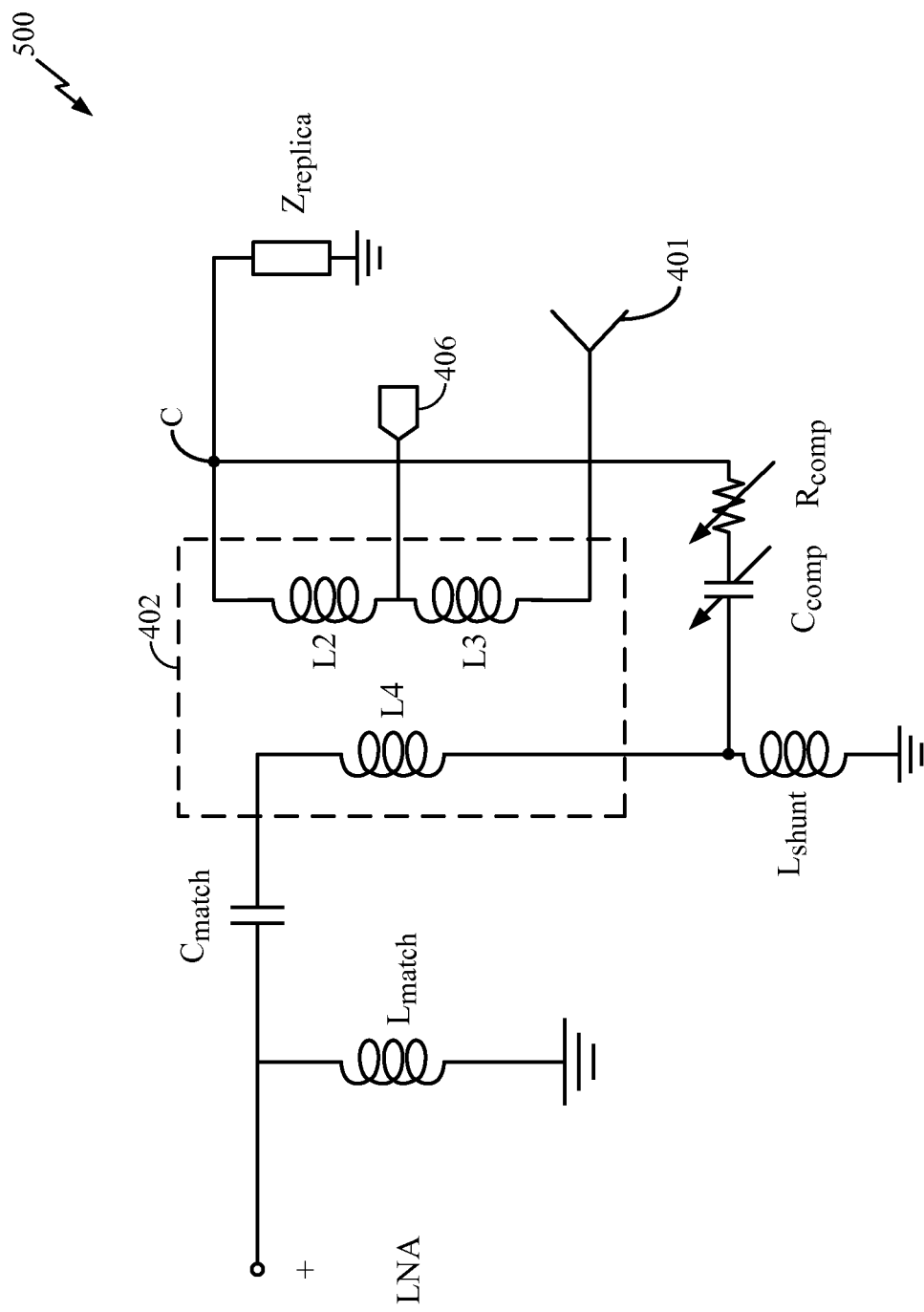
FIG. 9 depicts another transceiver including a transformer, in accordance with an exemplary embodiment of the present invention.

FIG. 9 is a circuit diagram of a transceiver 500, according to an exemplary embodiment of the present invention. As will be described more fully below, transceiver 500 includes a single transformer with feed forward cancellation. Transceiver 500 includes antenna 401 coupled to a transformer 402 having inductors L2, L3, and L4. Transceiver 500 may also include a replica port including a resistor Zreplica, which is coupled to inductor L2 of transformer 402. Moreover, power amplifier 406 is coupled to the center port of transformer 402 (i.e., between inductors L2 and L3). Transceiver 450 may also include a capacitor $C_{comp}$ and a resistor $R_{comp}$, wherein one end of resistor $R_{comp}$ is coupled to a node C and one end of capacitor Ccomp is coupled between inductor L4 and inductor $L_{shunt}$. For example, adjustment unit 106, as illustrated in FIG. 1, may comprise a feedforward cancellation unit including capacitor $C_{comp}$ and a resistor $R_{comp}$. In addition, transceiver 500 includes a capacitor $C_{match}$ and an inductor $L_{match}$. By way of example, tunable bandpass matching network 104 (see FIG. 1) may comprise capacitor $C_{match}$ and an inductor $L_{match}$.

It is noted that values of resistor $R_{comp}$ and capacitor $C_{comp}$ may be adjusted based on a strength of a transmitter signal measured at a receiver port (i.e., transmit leakage). As may be understood by a person having ordinary skill in the art, transceiver 500 is configured to inject a portion of a transmit signal back to the LNA to at least partially cancel the transmit signal (i.e., transmit leakage) at the input of the LNA, wherein the transmit signal has an amplitude and phase controlled by values of resistor $R_{comp}$ and capacitor $C_{comp}$. The values of capacitor $C_{comp}$ and resistor $R_{comp}$ may be controlled by circuitry, such as signal processing circuitry 302 illustrated in FIG. 5 or 6. In comparison to the transceivers illustrated in FIGS. 7 and 8, which include dual transformers, a transceiver including a single transceiver may exhibit less loss.

Figure 10:
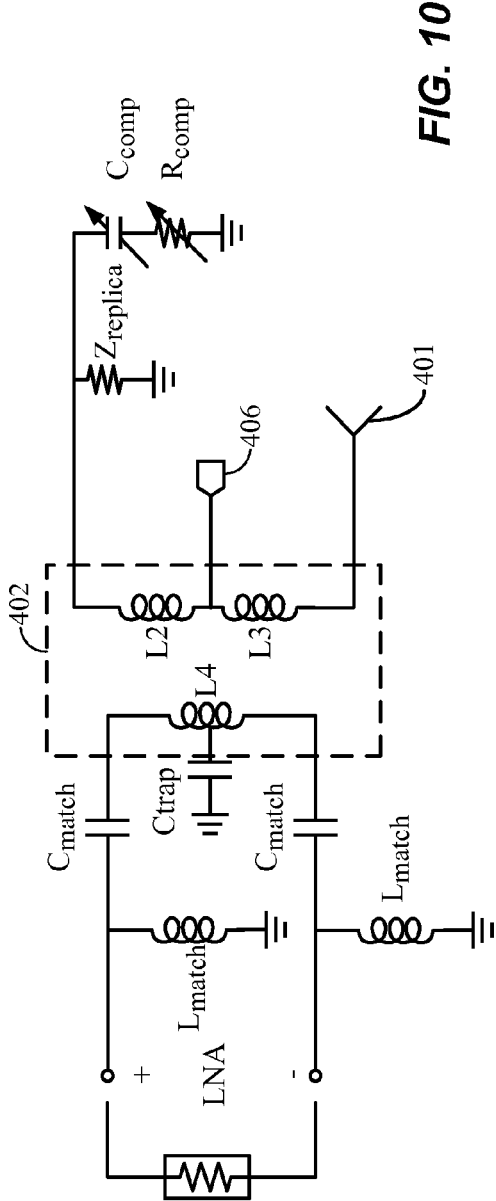
FIG. 10 depicts another transceiver including a transformer, in accordance with an exemplary embodiment of the present invention.

FIG. 10 is a circuit diagram of a transceiver 550, according to an exemplary embodiment of the present invention. It is noted that transceiver 550 may comprise an example implementation of transceiver 100 illustrated in FIG. 1. As will be described more fully below, transceiver 550 includes a single transformer without feed forward cancellation. Transceiver 550 includes antenna 401 coupled to transformer 402 having inductors L2, L3, and L4. Transceiver 550 may also include a replica port including resistor $Z_{replica}$, which is coupled to inductor L2 of transformer 402. Moreover, power amplifier 406 is coupled to the center port of transformer 402 (i.e., between inductors L2 and L3). Transceiver 550 may also include capacitor $C_{comp}$ and resistor $R_{comp}$ coupled in parallel with resistor $Z_{replica}$. For example, adjustment unit 106, as illustrated in FIG. 1, may comprise a feedforward cancellation unit including capacitor $C_{comp}$ and a resistor $R_{comp}$. It is noted that values of resistor $R_{comp}$ and capacitor Comp may be adjusted based on a strength of a transmitter signal measured at a receiver port (i.e., transmit leakage). The values of capacitor $C_{comp}$ and resistor $R_{comp}$ may be controlled by circuitry, such as signal processing circuitry 302 illustrated in FIG. 5 or 6. Due to being in parallel with resistor $Z_{replica}$, capacitor $C_{comp}$ and resistor $R_{comp}$ may be adequately controlled to easily tolerate process variations and sensing circuit errors.

In addition, transceiver 550 includes a capacitors $C_{match}$ and inductors $L_{match}$. By way of example, tunable bandpass matching network 104 (see FIG. 1) may comprise capacitor $C_{match}$ and an inductor $L_{match}$. It is noted that transceiver 550 comprises a single-ended configuration. Moreover, transceiver 550 includes a capacitor $C_{trap}$ coupled between a ground voltage and center port of the secondary side of transformer 402. Capacitor $C_{trap}$ may enable for transmitter common-mode cancellation.

Figure 11:
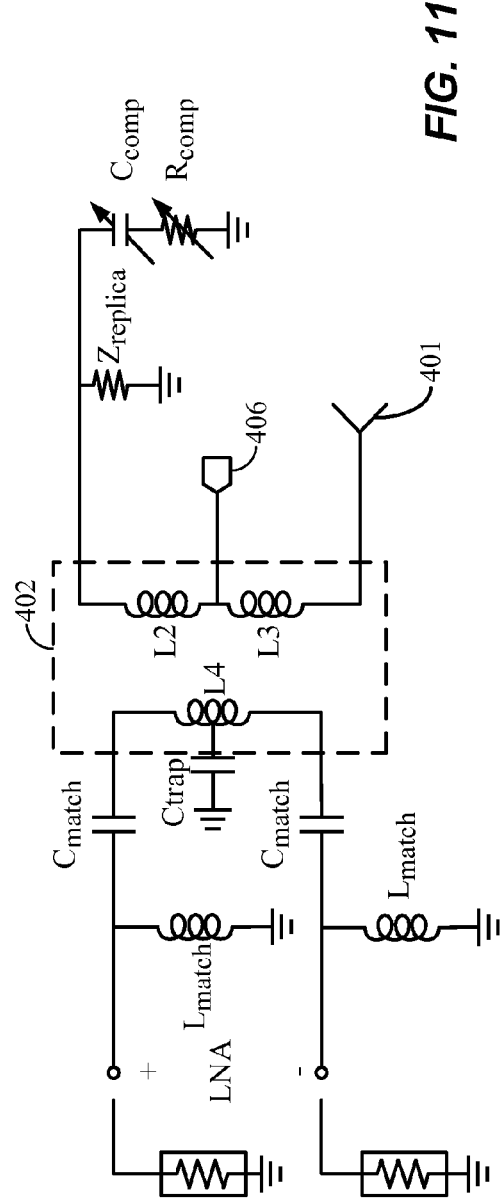
FIG. 11 depicts yet another transceiver including a transformer, according to an exemplary embodiment of the present invention.

FIG. 11 is a circuit diagram of a transceiver 600, according to an exemplary embodiment of the present invention. It is noted that transceiver 600 may comprise an example implementation of transceiver 100 illustrated in FIG. 1. As will be described more fully below, transceiver 600 includes a single transformer without feed forward cancellation. Transceiver 600 includes antenna 402 coupled to transformer 452 having inductors L2, L3, and L4. Transceiver 450 may also include a replica port including resistor $Z_{replica}$, which is coupled to inductor L2 of transformer 452. Moreover, power amplifier 406 is coupled between inductors L2 and L3. Transceiver 400 may also include capacitor $C_{comp}$ and resistor $R_{comp}$ coupled in parallel with resistor $Z_{replica}$. For example, adjustment unit 106, as illustrated in FIG. 1, may comprise a feedforward cancellation unit including capacitor $C_{comp}$ and a resistor $R_{comp}$. It is noted that values of resistor $R_{comp}$ and capacitor $C_{comp}$ may be adjusted based on a strength of a transmitter signal measured at a receiver port. The values of capacitor $C_{comp}$ and resistor $R_{comp}$ may be controlled by circuitry, such as signal processing circuitry 302 illustrated in FIG. 5 or 6. Due to being in parallel with resistor $Z_{replica}$, capacitor $C_{comp}$ and resistor $R_{comp}$ may be adequately controlled to easily tolerate process variations and errors. As will be appreciated by a person having ordinary skill in the art, transceiver 600 is single-ended, while transceiver 550 illustrated in FIG. 10 is fully differential.

In addition, transceiver 600 includes capacitors $C_{match1}$ and $C_{match2}$ and inductors $L_{match1}$ and $L_{match2}$ coupled to the LNA. By way of example, tunable bandpass matching network 104 (see FIG. 1) may comprise capacitors $C_{match1}$ and $C_{match2}$ and inductors $L_{match1}$ and $L_{match2}$. Moreover, transceiver 600 includes capacitor $C_{trap}$ coupled between a ground voltage and center port of the secondary side of transformer 402. As noted above, capacitor $C_{trap}$ may enable for transmitter common-mode cancellation. It is noted that transformer 402, capacitor $C_{comp}$ and resistor $R_{comp}$, as illustrated in FIGS. 9-11, may be referred to as a "tunable unit."

It is noted that for the exemplary embodiments illustrated in FIGS. 7-11, it is assumed that transformers are unbalanced, such that the power loss from a transmit path to an antenna port is below 3 dB for maximum power transfer and system efficiency, while the losses from the antenna port to a receive path in increased, at the expense of noise figure (NF). Further, NF degradation due to receiver-antenna loss is assumed to be reduced by the use of an LNA of higher input impedance (e.g., 50, 100, or 200 ohms).

Figure 12:
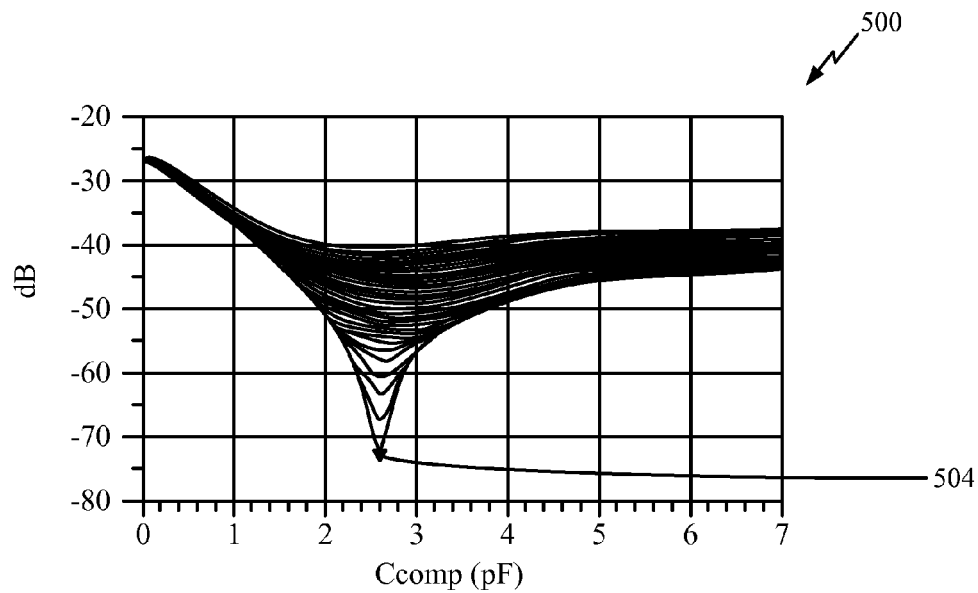
FIG. 12 is a plot illustrating an amount of isolation according to various component values.
Figure 13:
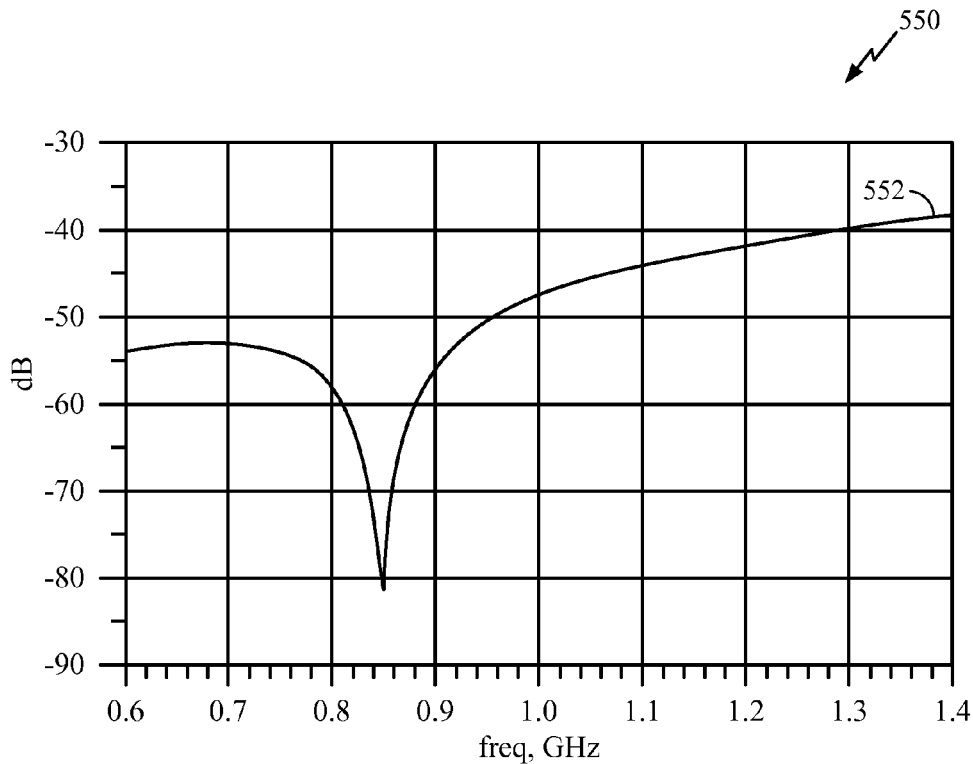
FIG. 13 is a plot illustrating an amount of isolation versus frequency and according to the optimal component values.

FIG. 12 is a plot 500 illustrating an amount of isolation (i.e., transmit to receive) in dB (i.e., y-axis) according to various values for capacitor $C_{comp}$. Further, each curve represents a different value for resistor $R_{comp}$. In the example illustrated in FIG. 12, a value for resistor $R_{comp}$ of 306 ohms and a value for capacitor $C_{comp}$ of 2.6 pF provides optimal isolation, which is depicted by reference numeral 504. FIG. 13 is another plot 550 illustrating an amount of isolation (i.e., transmit to receive) in dB (i.e., y-axis) versus frequency and according to the optimal values for capacitor $C_{comp}$ and resistor $R_{comp}$. As illustrated by signal 552 in FIG. 13, an associated transceiver provides approximately −80 dB of isolation at approximately 0.85 GHz.

Figure 14:
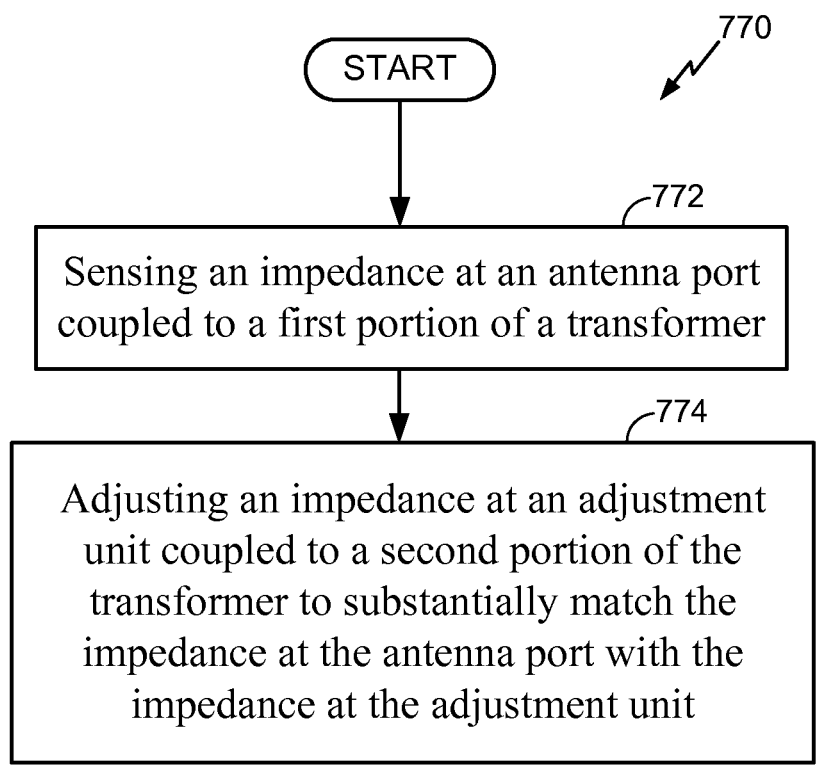
FIG. 14 is a flowchart illustrating a method, in accordance with an exemplary embodiment of the present invention.

FIG. 14 is a flowchart illustrating a method 770, in accordance with one or more exemplary embodiments. Method 770 may include sensing an impedance at an antenna port coupled to a first portion of a transformer (depicted by numeral 772). Further, method 780 may include adjusting an impedance at an adjustment unit coupled to a second portion of the transformer to substantially match the impedance at the antenna port with the impedance at the adjustment unit (depicted by numeral 774).

Figure 15:
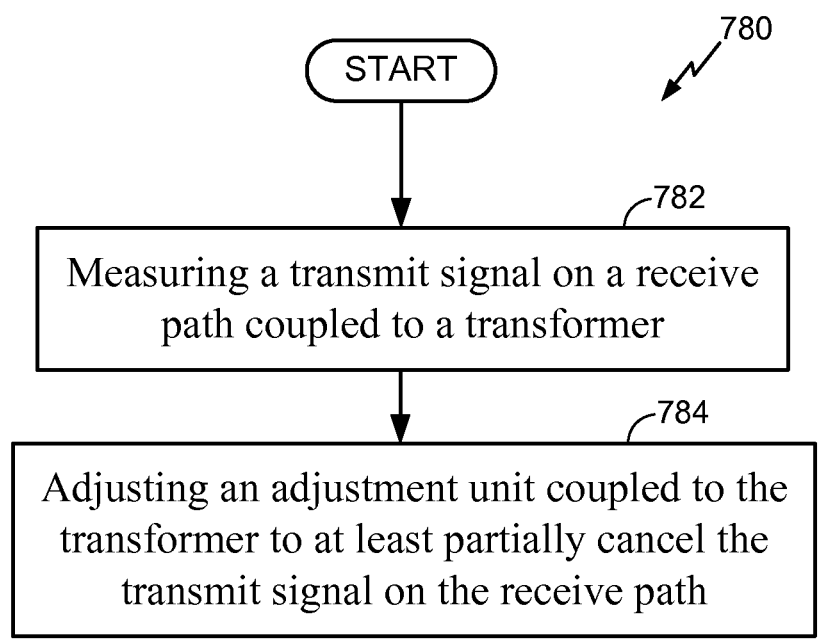
FIG. 15 is a flowchart illustrating another method, in accordance with an exemplary embodiment of the present invention.

FIG. 15 is a flowchart illustrating another method 780, in accordance with one or more exemplary embodiments. Method 780 may include measuring a transmit signal on a receive path coupled to a transformer (depicted by numeral 782). Further, method 780 may include adjusting an adjustment port coupled to the transformer to at least partially cancel the transmit signal on the receive path (depicted by numeral 784).

Figure 16:
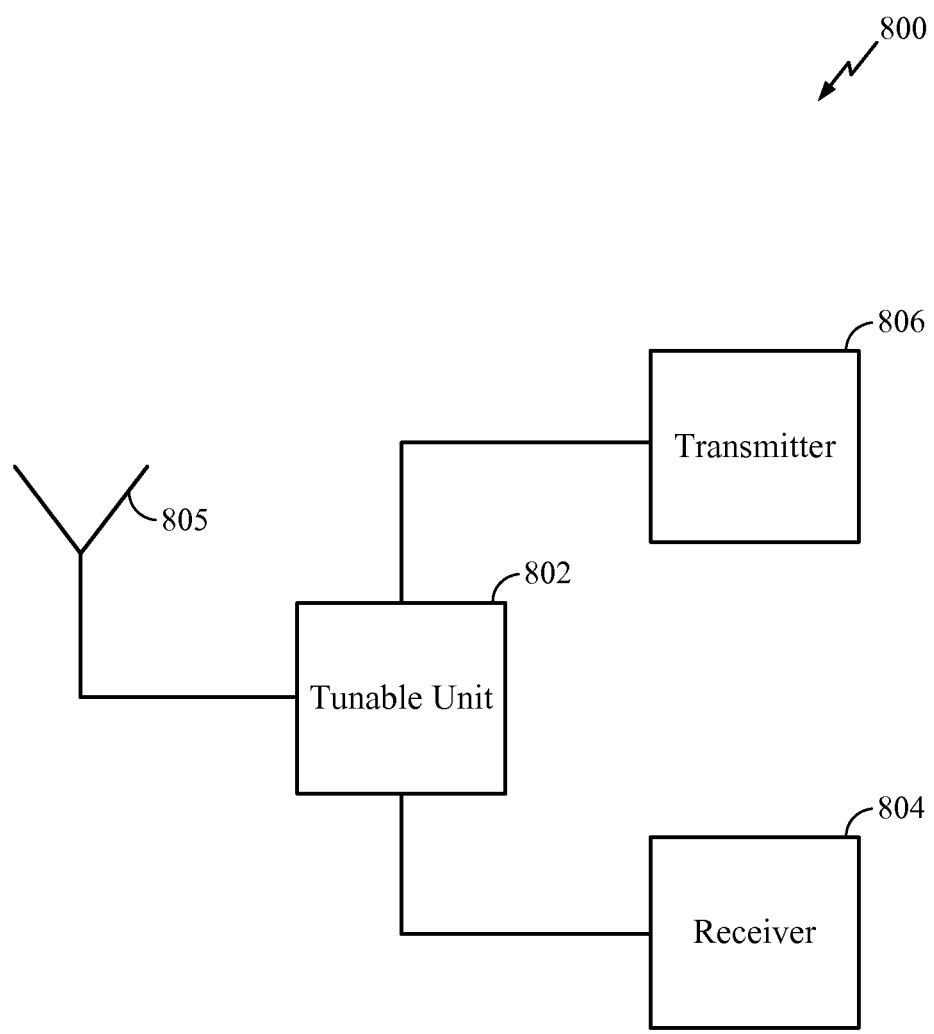
FIG. 16 is a block diagram of a system including a tunable unit coupled to each of a transmitter and a receiver, according to an exemplary embodiment of the present invention.

FIG. 16 illustrates a system 800 comprising a tunable unit 802 coupled to each of a receiver 804 and a transmitter 806. Further, tunable unit 802 may be configured for coupling to an antenna 805. It is noted that tunable unit 802 may comprise one or more of the embodiments described above. Tunable unit 802 may include one or more transformers coupled to each of a receive path of receiver 804 and a transmit path of transmitter 806. Tunable unit 802 and may be configured for providing impedance balancing to enable for adequate transmitter to receiver rejection. Further, tunable unit 802 may be configured for feedforward cancellation and, therefore, may cancel at least a portion of a transmit leakage signal on a receive path.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A transceiver, comprising:
   a transformer having a first side coupled to a transmit path and a second side coupled to a receive path;
   an antenna tuning network coupled to a first portion of the first side and configured for coupling to an antenna; and
   an adjustment unit coupled to a second portion of the first side and configured for being adjusted in response to a measured amount of transmit leakage at an input of the receive path and to enable an impedance at the adjustment unit to be substantially equal to an impedance at the antenna tuning network.

2. The transceiver of claim 1, further comprising an antenna impedance sensor and control unit coupled to each of the antenna tuning network and the adjustment unit and configured for sensing an impedance at the antenna tuning network.

3. The transceiver of claim 1, the first side of the transformer comprising a primary side and the second side of the transformer comprising a secondary side.

4. The transceiver of claim 1, the transmit path coupled to a center port of a primary side of the transformer and the receive path coupled to a secondary side of the transformer.

5. The transceiver of claim 1, further comprising signal processing circuitry coupled between the receive path and the adjustment unit and configured to measure an amount of transmit leakage at an input of the receive path.

6. The transceiver of claim 5, the signal processing circuitry further configured to convey at least one signal to the adjustment unit to enable for adjustment thereof.

7. A method, comprising:
   sensing an impedance in a transceiver at an antenna port coupled to a first portion of a transformer; and
   adjusting an impedance in the transceiver at an adjustment port coupled to a second portion of the transformer in response to a measured amount of transmit leakage at an input of a receive path and to substantially match the impedance at the antenna port with the impedance at the adjustment port.

8. The method of claim 7, the sensing comprising sensing the impedance at the antenna port coupled to the first portion of a primary side of a first transformer.

9. The method of claim 8, the adjusting comprising adjusting the impedance at the adjustment port coupled to the second portion of the primary side of the first transformer.

10. The method of claim 7, further comprising sensing an amount of transmit leakage at a receive path coupled to a third portion of the transformer.

11. The method of claim 10, further comprising further adjusting the adjustment port in response to sensing the amount of transmit leakage at the receive path.

12. The method of claim 7, further comprising:
    sensing an amount of transmit leakage at a diversity receive path coupled to a portion of a second transformer coupled to the first transformer via the adjustment port; and
    adjusting a diversity adjustment port coupled to another portion of the second transformer in response to sensing the amount of transmit leakage at the diversity receive path.

13. A device, comprising:
    means for sensing an impedance in a transceiver at an antenna port coupled to a first portion of a transformer; and
    means for adjusting an impedance in the transceiver at an adjustment unit coupled to a second portion of the transformer in response to a measured amount of transmit leakage at an input of a receive path and to substantially match the impedance at the antenna port with the impedance at the adjustment unit.

* * * * *